(12) United States Patent
Nouvel et al.

(10) Patent No.: US 9,248,904 B2
(45) Date of Patent: Feb. 2, 2016

(54) SYSTEM FOR ASSISTING THE PILOT OF AN AIRCRAFT BY HAPTIC MEANS

(71) Applicant: Thales, Neuilly sur Seine (FR)

(72) Inventors: Christian Nouvel, Merignac (FR); Guillaume Lapeyronnie, La Brede (FR); Jean-Paul Berger, Valence (FR)

(73) Assignee: Thales, Neuilly sur Seine (FR)

( * ) Notice: Subject to any disclaimer, the term of this patent is extended or adjusted under 35 U.S.C. 154(b) by 246 days.

(21) Appl. No.: 13/710,365

(22) Filed: Dec. 10, 2012

(65) Prior Publication Data

US 2013/0154319 A1    Jun. 20, 2013

(30) Foreign Application Priority Data

Dec. 20, 2011  (FR) ...................... 11 03939

(51) Int. Cl.
*B64C 13/18*    (2006.01)
*B64C 13/00*    (2006.01)

(52) U.S. Cl.
CPC ................ *B64C 13/18* (2013.01); *B64C 13/00* (2013.01)

(58) Field of Classification Search
CPC ................................ B64C 13/18; B64C 13/16
USPC ........................................................ 244/175
See application file for complete search history.

(56) References Cited

U.S. PATENT DOCUMENTS

2004/0145118 A1*  7/2004  Carlson et al. ................ 273/360
2006/0131093 A1*  6/2006  Egami ............................ 180/272
2007/0244641 A1* 10/2007  Altan et al. .................... 701/300

FOREIGN PATENT DOCUMENTS

DE   10 2007 015432 A1   10/2008
EP        2 112 063 A2   10/2009
WO   WO 2011/140606 A1   11/2011

OTHER PUBLICATIONS

Aaron E. Sklar, e at., "Good vibrations: tactile feedback in support of attention aliocation and human-automation coordination in event-driven domains," Hum Factor.-, vol. ~1, No. 4, pp. 543-552 1 (Dec. 1999).*
J. J. Scott, et al., "A comparison of tactile, visual, and auditory warnings for rear-end collision prevention in simulated driving," Human Factors: The Journal of the Human Factors and Ergonomics Society, vol. 50, No. 2 pp. 264-275 (Apr. 2008).*
French Search Report for Counterpart French Patent Application No. 1103939, 8 pgs. (Sep. 10, 2012).

(Continued)

*Primary Examiner* — Justin Benedik
(74) *Attorney, Agent, or Firm* — Blakely, Sokoloff, Taylor & Zafman LLP (57) ABSTRACT

The invention relates to a system for assisting the pilot of an aircraft, which comprises aboard the aircraft:
 a computer,
 a set of sensors able to provide data to the computer and,
 a seat for the pilot equipped with haptic actuators controlled by the computer.

The computer comprises means for controlling each actuator or groups of actuators independently of one another, as a function of the data provided by the sensors. The seat comprising a back and a cushion, the actuators of the back and of the cushion comprise single-axis mini-rams distributed in the back and the cushion of the seat, whose displacement axes are respectively perpendicular to the back and to the cushion of the seat.

14 Claims, 7 Drawing Sheets

(56) References Cited

OTHER PUBLICATIONS

Simon J. Durnford et al., "Spatial Disorientation: A Survey of U.S. Army Helicopter Accidents 1987-1992," U.S. Army Aeromedical Research Laboratory Fort Rucker, Alabama, 47 pages (Jun. 1995).

J.J. Scott, et al., "A comparison of tactile, visual, and auditory warnings for rear-end collision prevention in simulated driving," Human Factors: The Journal of the Human Factors and Ergonomics Society, vol. 50, No. 2 pp. 264-275 (Apr. 2008).

Joroen H. Hogema, et al., "A Tactile Seat for Direction Coding in Car Driving: Field Evaluation," IEEE Transactions on Haptics, vol. 2, No. 4, pp. 181-188 (Oct.-Dec. 2009).

Aaron E. Sklar, et al., "Good vibrations: tactile feedback in support of attention aliocation and human-automation coordination in event-driven domains," Hum Factors, vol. 41, No. 4, pp. 543-552 (Dec. 1999).

Jan B. F. van Erp et al., "A Tactile Cockpit Instrument Supports the Control of Self-Motion During Spatial Disorientation," *Human Factors: The Journal of the Human Factors and Ergonomics Society*, vol. 48, No. 2, pp. 219-228 (2006).

Gregory M. Fitch et al., "Toward Developing an Approach for Alerting Drivers to the Direction of a Crash Threat." *Human Factors: The Journal of the Human Factors and Ergonomics Society*, vol. 49, No. 4, pp. 710-720 (Aug. 2007).

\* cited by examiner

FIG.7 ated by means of verbal dialogue) require very regular practical training. The following mission types may for example be cited:
SYSTEM FOR ASSISTING THE PILOT OF AN AIRCRAFT BY HAPTIC MEANS

TECHNICAL FIELD

The field of the invention is that of assistance to the pilot of an aircraft.

BACKGROUND OF THE INVENTION

The activity of an aircraft crew consists mainly in:

Piloting the aircraft while the whole time remaining in the flight domain envisaged by the constructor. The flight conditions are in general of fly-by-sight or "VFR" type, the acronym standing for the expression "Visual Flight Rules". The pilot takes his visual references on the landscape and there are no particular problems. When the situation is degraded through impaired weather conditions for example through reduced visibility (mist or untimely fog, flights at twilight or at night etc.) and/or by untimely movements of the craft related to the wind, to turbulence near the relief or near water etc., or more generally when the pilot undergoes spatial disorientation, he is compelled to direct his gaze into the cabin to pilot with the instruments. In this case he uses known gyroscopic means (artificial horizon, directional gyrocompass, etc.). The use of these means demands very good training and in certain cases may be rendered very difficult because of the dizziness and sensory illusions felt by the pilot, which are in contradiction with the instruments.

Monitoring the exterior environment to take into account certain types of threats which may lead to tricky and/or catastrophic situations. Among the types of threats, may be cited for example:

an encounter with another aircraft which is a risk that must be detected very early so as to be able to engage an avoidance maneuver in complete safety;

an encounter with a terrain (mountains, etc.) and/or artificial obstacles (antennas, wind turbines, etc.) which is a relatively common risk in view of the low altitude of missions;

the departure of a missile coming from a certain direction.

In flight conditions of fly-by-sight (VFR) and/or fly-by-instruments or "IFR" type, the acronym standing for the expression "Instrument Flight Rules", the single pilot (and/or the twin crew) must at any moment know where he is with respect to the threats of terrain type as well as to other aircraft. The aircraft may be equipped with systems of "Terrain Avoidance Warning System (TAWS)" type as well as systems of "Traffic Collision Avoidance System (TCAS)" type. These systems are independent and provide specific visual information on dedicated screens as well as audible alarms. The pilot must summarize the information, adopt a tactic in real time and act on the piloting.

Training to learn to manage particular missions with severe constraints. Flight simulators are often used for training and practicing skills on airliners. Their performance level is very often significant. For helicopters, despite considerable progress, it is still impossible to use this type of simulator in an effective manner within the framework of certain specific missions and/or certain flight phases; nothing can replace practical experience. Moreover the level of noise and vibrations of the machine, the variety of missions (in the sense of the terrain and weather) as well as the very nature of the work (cooperation with several people synchronized by means of verbal dialogue) require very regular practical training. The following mission types may for example be cited:

the winching of an injured individual while hovering which requires good management of height relative to the ground or to the water as well as good coordination of the pilot with the manager of the winch;

the transport of external loads in dangerous zones (mountainous, etc.).

Being coached by an instructor to learn to:

interpret the interior and exterior environment during particular missions with severe constraints;

properly manage dialogue and task's partitioning between a twin crew.

Finally, whether involving these piloting, monitoring, training and/or coaching missions, and although today's aircraft are more stable and less noisy than in the past, the reading of the instruments (which is not always easy for the pilot) and fatigue may impede the pilot in concentrating on very precise piloting. Hence the existence of devices for assisting the pilot: but they are essentially based on utilizing human visual and/or auditory faculties.

Consequently, to date there is still a need for a system making it possible to improve pilot assistance.

SUMMARY OF THE INVENTION

More precisely the subject of the invention is a system for assisting the pilot of an aircraft, which comprises aboard the aircraft:

a computer, a set of sensors able to provide data to the computer and, a seat for the pilot equipped with haptic actuators controlled by the computer.

It is mainly characterized in that:

the computer comprises means for controlling each actuator or groups of actuators independently of one another, as a function of the data provided by the sensors, and in that the seat comprising a back and a cushion, the actuators of the back and of the cushion comprise single-axis rams distributed in the back and the cushion of the seat, whose displacement axes are respectively perpendicular to the back and to the cushion of the seat.

This system for assisting the pilot makes it possible to use "haptic" faculties to code a certain amount of information by way of vibrations transmitted by means of the seat, so as to thus:

Aid the crew to pilot under certain critical conditions:

Improve monitoring and safety in varied missions and/or situations;

Improve coaching and training by using the seat in an intuitive manner;

Take long-term physical health and short-term fatigue into account.

The seat is in general provided with a safety harness also equipped with distributed actuators, which are preferably vibrators.

When the seat comprises lateral returns, actuators with single-axis mini-rams are also distributed in these returns.

According to a characteristic of the invention, the rams being able to move according to a displacement length lying within a predetermined range, at a speed below a predetermined maximum speed and at a frequency below a predetermined maximum frequency, the control means for the actuators or for the groups of actuators comprise means for controlling the length and/or the speed and/or the frequency of displacement.

The system advantageously comprises a device for damping the seat.

It optionally comprises a second seat intended for a copilot equipped with actuators like the seat of the pilot. In this case, the aircraft comprising at least one control stick, this stick may be furnished with a control box linked to the computer and comprising means for dispatching to the computer control commands for the actuators of the other seat.

The sensors are for example sensors:
for piloting, that is to say sensors of attitude, of position, of altitude, of height and of acceleration,
for detecting threats.

The aircraft being equipped with traction means for pulling an external load by means of a cable, the sensors preferably comprise sensors of data regarding angle of the cable relative to the vertical, length and tension of the cable.

According to a characteristic of the invention, the assistance system comprises linked to the computer, a general control panel comprising means for selecting a piloting and/or monitoring and/or training mission, the actuators being controlled by the computer as a function of the mission (or missions) selected.

According to another characteristic of the invention, it comprises linked to the computer, at least one screen for displaying graphical information regarding monitoring of the environment of the aircraft and/or graphical information regarding piloting and/or training.

The aircraft is typically an airplane or an helicopter.

BRIEF DESCRIPTION OF THE DRAWINGS

Other characteristics and advantages of the invention will become apparent on reading the detailed description which follows, given by way of non limiting example and with reference to the appended drawings in which:

FIG. 2 schematically represent diverse views of the seat which are:
an end-on view (FIG. 2a),
a top view (FIG. 2b),
the safety harness or straps (FIG. 2c),
a perspective view without the safety strap (FIG. 2d);

FIG. 3 schematically represent an exemplary geometric to arrangement of mini-rams in the cushion of the seat (FIG. 3b) and a sectional view of a mini-ram (FIG. 3a), FIG. 4 schematically represents an exemplary general control panel screen, FIG. 5 schematically represents an exemplary box mounted on a control stick.

Across the figures, the same elements are labeled by the same references.

DETAILED DESCRIPTION

Figure 1:
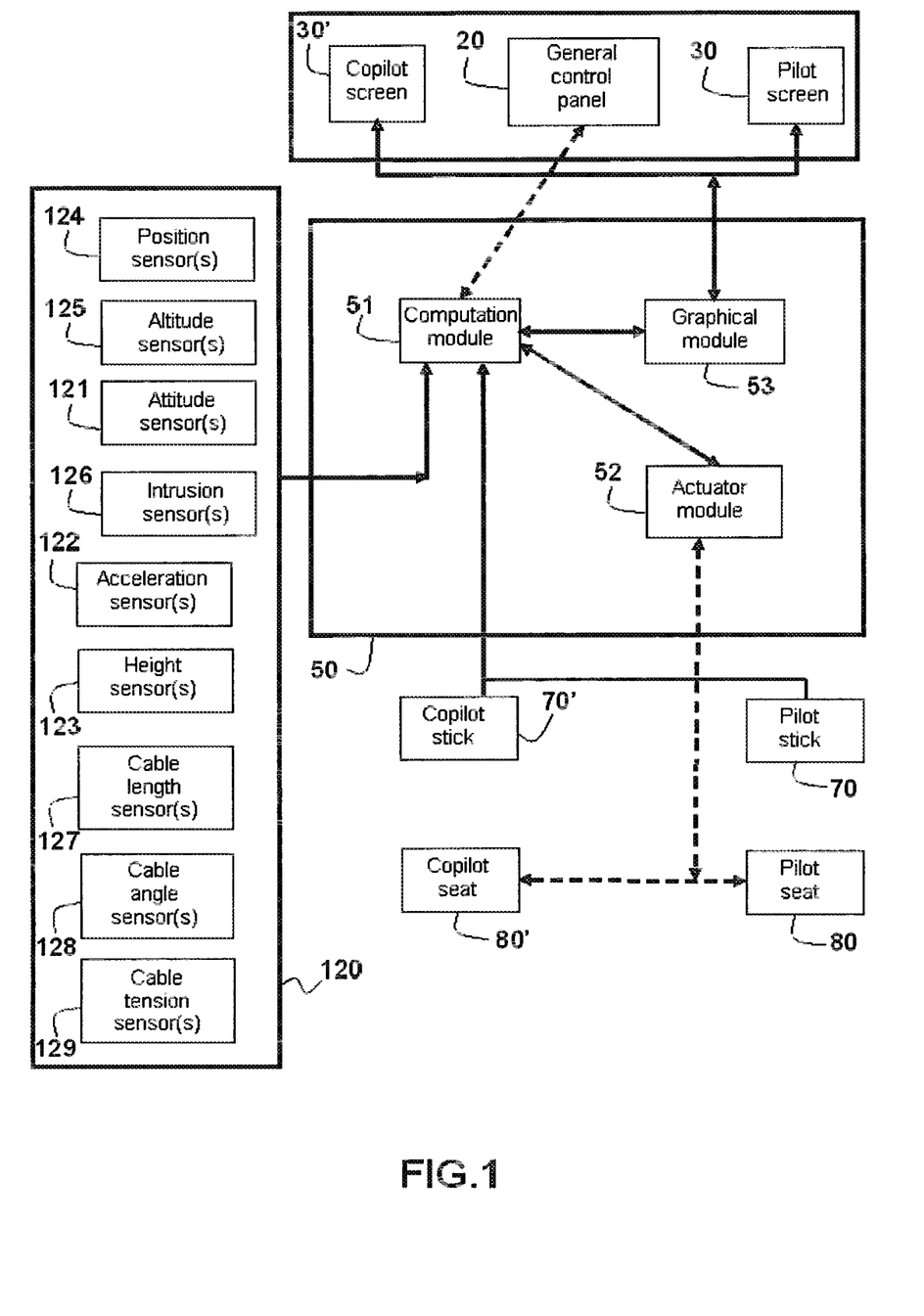
FIG. 1 schematically represents an exemplary system for assisting the pilot, according to the invention.
Figure 2A:
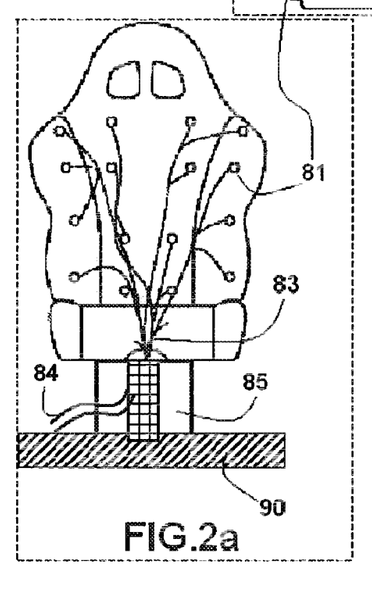
Figure 2B:
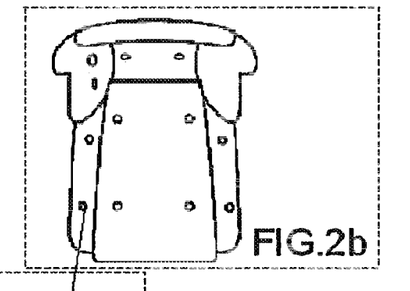
Figure 2C:
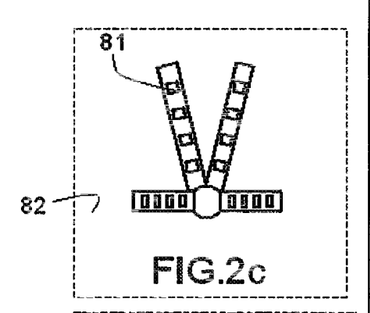
Figure 2D:
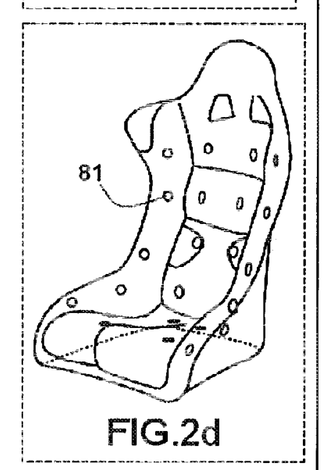

An assistance system according to the invention is described in conjunction with FIG. 1. It comprises the following onboard elements:
a set of sensors 120;
a computer 50 linked to the sensors,
a seat for the pilot 80 and optionally a seat for the copilot 80' respectively equipped with a set of actuators 81 (shown in FIG. 2) which are controlled by the computer and are included in the sea1t and preferably in the safety straps (or harness) 82 of the seat.

It advantageously comprises a man-machine interface called the general control panel 20 linked to the computer 50 and/or a display screen for the pilot 30 for graphical information arising from the computer 50. A display screen 30' is optionally envisaged for the copilot.

Optionally the system furthermore comprises a control box situated in the pilot's stick 70 and optionally in the copilot's stick 70'.

The various elements of the system will be detailed.

Aircrafts are equipped with various categories of sensors dedicated to the various missions undertaken by the crew that is to say the pilot and optionally his copilot. The main missions are piloting, monitoring, training and coaching.

The sensors used for piloting are:
One (or more) attitude sensor(s) 121 which delivers (deliver) information about the angles of roll, of trim and of yaw of the aircraft; this digital information is provided by standard systems of artificial horizon, turning indicator, heading hold type and/or of inertial unit type installed aboard the aircraft:
One (or more) acceleration sensor(s) 122 which delivers (deliver) information about the accelerations undergone by the aircraft about the yaw, roll, pitch axes; this digital information is provided by standard systems of inertial unit type or specific systems based on accelerometers, gyroscopes;
One (or more) height sensor(s) 123 which delivers (deliver) information about the current height for flying over the terrain. This digital information is provided by active systems of radioprobe type and/or systems which compute the height as a function of the current position of the aircraft and of the content of an onboard terrain database;
One (or more) position sensor(s) 124 which delivers (deliver) information about the longitude and the current latitude of the aircraft. This digital information is provided by conventional systems of Global Positioning System (GPS) type, by radio electric means (VOR-DME), by inertial units, by the Flight Management System (FMS), etc.;
One (or more) altitude sensor(s) 125 which delivers (deliver) information about the aircraft's current altitude. This digital information is provided by conventional systems of altimeter, inertial unit type, etc;

The sensors used for monitoring are in addition to the sensors cited hereinabove for piloting, one (or more) intruder sensor(s) 126 which delivers (deliver) information about the threats present in the aircraft's close environment. These threats may be other aircraft, natural elements (mountains) or artificial elements (pylons, buildings, etc.). This digital information is provided by active systems (of radar, lidar type, etc.), and/or passive systems of camera type and/or by systems which compute the threats as a function of the current position of the aircraft and of the content of onboard databases.

The sensors used for training and coaching are those used for piloting and monitoring.

The crew of an helicopter may be entrusted with a mission to rescue or transport an external load by means of a cable. The sensors used in this case are:
One (or more) cable length sensor(s) 127 which delivers (deliver) information about the current length of cable unwound during a rescue or transport of merchandise. This digital information is typically provided by the winch with schemes similar to those used in cars for kilometers;
One (or more) cable angle sensor(s) 128 which delivers (deliver) information about the longitudinal and lateral angles of an external load relative to the vertical. This digital information is typically provided by the winch with angular sensors tied to the cable, optionally cameras;

One (or more) cable tension sensor(s) 129 which delivers (deliver) information about the force exerted by the cable on the winch. This digital information is typically provided by the winch by means of strain gauges.

The onboard computer 50 comprises a computation module 51 an actuator module 52 and optionally a graphical module 53.

The computation module 51 is a conventional computer having buses for interfacing with the whole set of sensors. These buses are standardized and of aeronautical type (ARINC429, RS422, AFDX etc.). This module comprises a computation processor capable of making conventional computations on 32-bit and/or 64-bit integer and floating numbers, and has local random-access memories (RAM type) as well as ones which are shared with the graphical module 53 and the actuator module 52. The executable code is stored on read-only memory (PROM, EEPROM type etc.).

The graphical module 53 is a graphical computer having buses for interfacing with the crew's screens 30 and 30'. These graphical buses are digital and standardized and of aeronautical type (ARINC etc.). This module comprises a graphical processor capable of displaying 2D and/or 3D synthetic images by means of wire-frame or surface graphical primitives (vectors, circular arcs, alphanumerics, polygonal surfaces etc.). The attributes of plots are also available (thicknesses of lines, dashes, colors, visibility etc.). Geometric transformations of translation, rotation, zoom and projection type are available. The graphical primitives, the plot attributes as well as the geometric transformations are parametrizable in real time by means of variables. These parameters are modifiable from the computation module 51. This graphical module has a local random-access memory (RAM type) as well as a random-access memory shared with the computation module. The graphical executable code is stored on read-only memory (type PROM, EEPROM etc.).

The actuator module 52 comprises a set of independent pathways which drive in real time each actuator 81 situated in the seat(s) of the crew, in the safety straps of the seat as well as the actuators of a vibration-damping device 85. Each pathway has a microcontroller capable of executing basic control laws. These laws are of sinusoid, ramp, triangle, square type, according to the type of longitudinal displacement that it is desired to impart to the actuator (progressive, cyclic, symmetric, etc). The triggering thresholds, the amplitudes, the frequencies, turn-on, turn-off, etc., are parametrizable in real time by means of variables. These parameters are modifiable from the computation module 51. This actuator module has local random-access memories (RAM type) as well as ones shared with the computation module. The executable code of the control laws is stored on read-only memory (type PROM, EEPROM etc.). This module manages the electrical power for controlling the actuators. Each pathway is linked by electrical wires 83 to the actuators of a seat. A certain number of pathways may be linked by electrical wires 84 to a system 85 for damping the vibrations of the seat. The power of each mini-ram which by way of the seat exerts a pressure on the body of the crew, is seen as the product of a force times the speed of displacement. The displacement of a ram or of a set of rams makes it possible to simulate more or less violent wave effects and to thus code the indications for the pilot in a gradual manner for example by progressively attracting his attention, or in a semantic manner by taking specific alarms into account, or by immediate actions on the controls.

According to the invention the seat 80 of the pilot as well as that of the copilot are equipped with actuators 81 shown in FIG. 2.

Preferably, the safety straps 82 are also equipped with actuators which are generally mini-vibrators, "mini" so as to be able to be integrated into the safety strap.

FIG. 2 show an exemplary implantation of the actuators 81 placed in the body of the seat in this instance in the cushion (=the part of the seat on which the pilot sits), in the back as well as in the lateral parts when the seat is provided therewith. Mini-rams are essentially used for these parts of the seat: "mini" since their length makes it possible to integrate them into the thickness of the seat (they typically have a length of between 5 cm and 10 cm). Each mini-ram is driven in an independent manner by the actuator module 52. The electrical wires 83 which dispatch the signals to the actuators are represented only in FIG. 2a. These wires exit through the foot of the seat.

A damping device 85 links the pilot's seat to the floor 90 of the aircraft. This damping device contains for example one or more rams driven electrically by the actuator module 52.

Figure 3A:
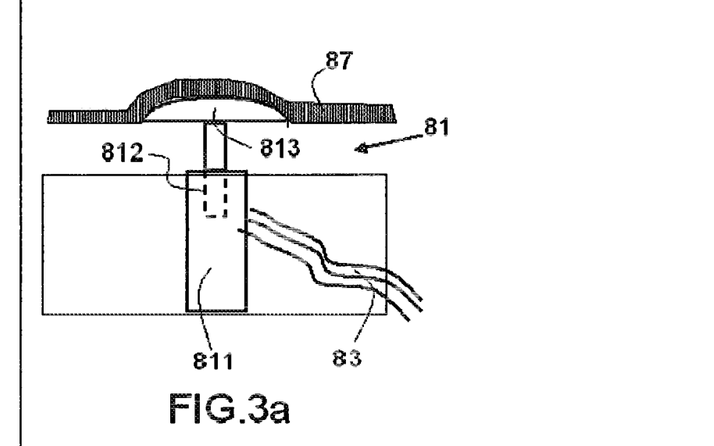

FIG. 3a presents in detail an actuator 81 as well as an exemplary geometric arrangement of actuators in the cushion or the back of the seat. The fixed part 811 of the mini-ram is fixed inside the body 86 of the seat. The mobile part 812 is surmounted by a spherical cap 813 in contact with the cover 87 of the seat. Electric drive is ensured by the wires 83.

Figure 3B:
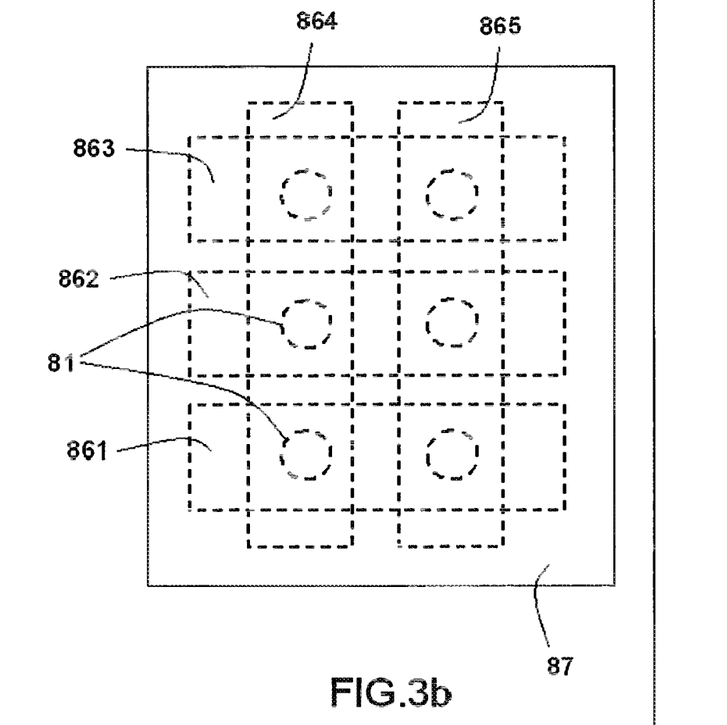

The cover 87 of the seat undergoes the deformations imposed by the thrust of the actuators 81. The cushion comprises for example five "spatial" zones indicated dashed in FIG. 3b encompassing several mini-rams 81 under the cover 87: the front 861, the middle 862, the close rear 863 of the back, the right 864, the left 865. Likewise the back can comprise several spatial zones encompassing several mini-rams; likewise for the lateral parts of the body of the seat. These spatial zones are managed by the computer 50 to deform the seat in one direction or several directions at the same time.

Figure 4:
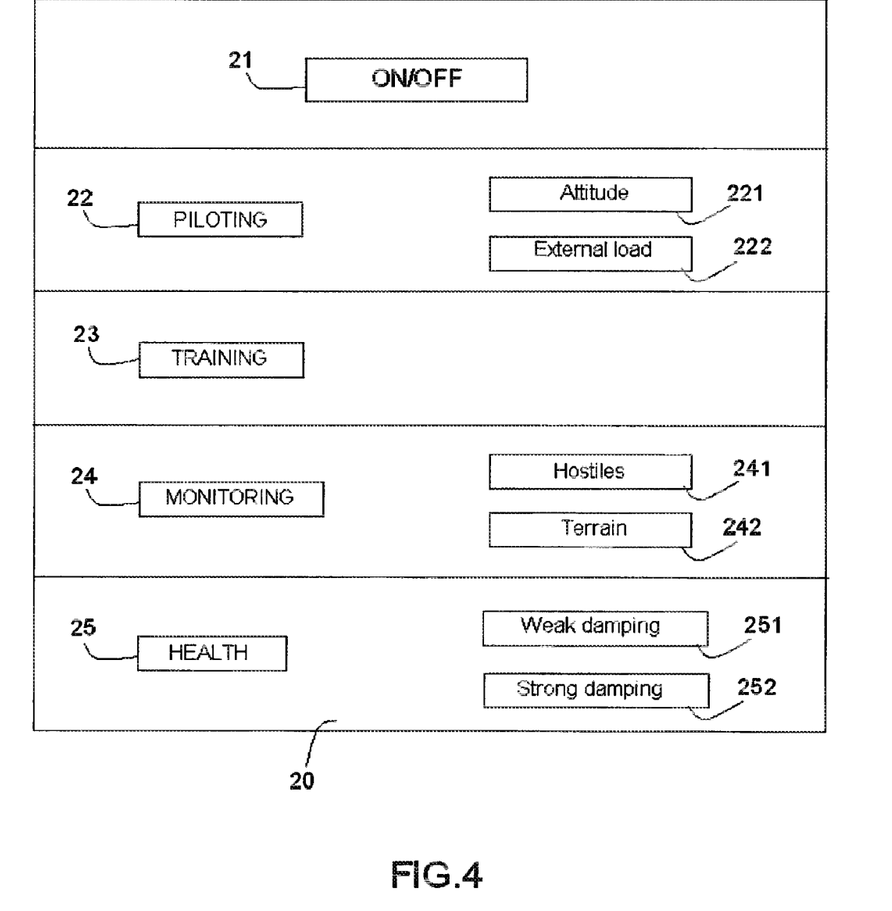

The general control panel 20 is described in conjunction with FIG. 4. In this exemplary embodiment, a certain number of buttons with two states (enabled/disabled) or any other equivalent means make it possible to activate or to deactivate a set of basic functions. To each of these functions there correspond sub-functions also activatable by means of buttons with two states. These buttons are for example lit up in green when the associated function is active, in red when it is deactivated.

These functions are:

The on/off function 21 which is the general switch of the proposed system.

The piloting function 22 which once activated, makes it possible to authorize the automatic computation of the deformations of the seat so as to indicate to the pilot the changes of trajectory to be applied. These indications are provided by the part of the seat in contact with the pilot (cushion, back, lateral parts). The seat is deformed either laterally, or longitudinally, or with multiple combinations by means of a set of actuators piloted electrically by the computer.

During normal piloting, a zone of the seat, the cushion for example (or several zones), deforms slowly to indicate to the pilot the changes of attitude along the roll and pitch axes. This zone of the seat is slaved to the displacement controls for the mini-rams. In abnormal situations, that is to say in the case of spatial disorientation or when the attitude of the aircraft begins to become dangerous or when threats are approaching, the deformations may become more "violent". They serve to indicate to the pilot whether it is necessary to make the aircraft climb, tilt (towards the front, towards the right etc.), . . . .

Figure 7A:
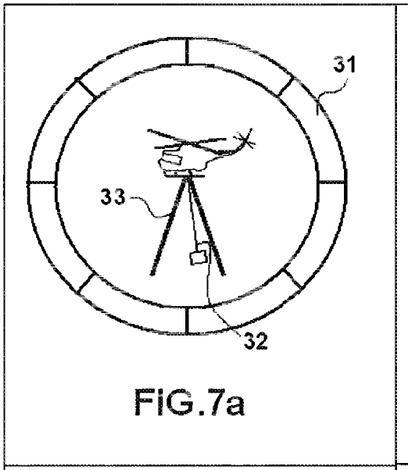
Figure 7B:
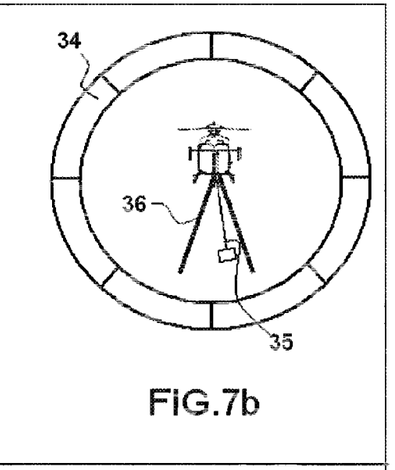
Figure 7C:
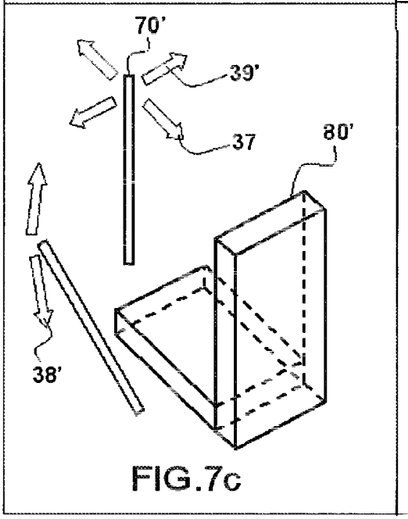
Figure 7D:
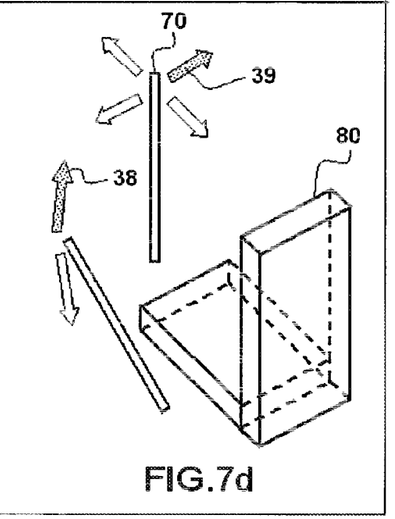

The attitude sub-function 221 authorizes the computation of the limit attitudes as well as the computation of the corrections on the sticks; this sub-function is associated with FIGS. 7c and 7d;

The external load sub-function 222 authorizes the monitoring of the angles and limit tensions of the cable as well as the computation of the corrections on the sticks; this sub-function is associated with the graphical representations shown in FIGS. 7a and 7b. In the case where an external load is present, the deformations of the seat also serve to indicate the trim corrections for anticipating and maintaining the angular movements of the load in a "conical" safety zone. Monitoring of the height of the external load with respect to the ground as well as of the tension in the cable make it possible to indicate to the pilot whether it is necessary to make the helicopter climb and/or tilt (towards the front, towards the right etc.).

The training function 23 which once activated, makes it possible to authorize the use of control boxes 71 mounted on the pilot's stick 70. The controls may be dispatched to the student's seat by the monitor in manual mode; the reverse is also possible and optionally allows a form of twin dialogue.

The monitoring function 24 which once activated, makes it possible to authorize the automatic computation of the alarms to indicate to the pilot the direction of the threats. The part of the seat corresponding to these alarms is controlled for example in the following manner: a violent global thrust in the cushion upwards indicates to the pilot that the ground is not far and that it is necessary to climb urgently, or a global thrust in the back when retreating from a close obstacle for example indicates to the pilot that this obstacle is not far and that it is necessary to stop retreating or indeed advance. A general alarm may be provided by a vibration throughout the safety strap.

The hostile threats sub-function 241 which once activated, monitors the presence of other aircraft around the aircraft;

The terrain threat sub-function 242 which once activated, monitors the proximity of dangerous terrains and/or obstacles around the aircraft;

These two sub-functions are typically associated with the graphical representations shown in FIGS. 7a and 7b.

The health function 25 which once activated, makes it possible to implement in real time the damping of the seat so as to minimize the vibrations on the pilot's skeleton and thus take into account his health and his fatigue. It is known that at the end of their career many seasoned pilots have problems with lumbar pains. The weak damping sub-function 251 and strong damping sub-function 252 are exclusive in this example but could be replaced with a potentiometer. They make it possible to adopt a gain adjustment suited to the current conditions of the mission, by adapting for example the speed of the actuators so as to drive the damping of the rams as a function of the acceleration of the aircraft.

The screens 30 are of colored Multi Function Display (MFD) type, furnished locally with the on/off control as well as brightness and contrast adjustments. The technology is standard (Tubes, LCD, retro-projection etc.). The dimension of the screen is not very critical having regard to the simplicity of the images to be presented (6×6 inches may suffice). These screens are piloted by the graphical module 53.

Figure 5:
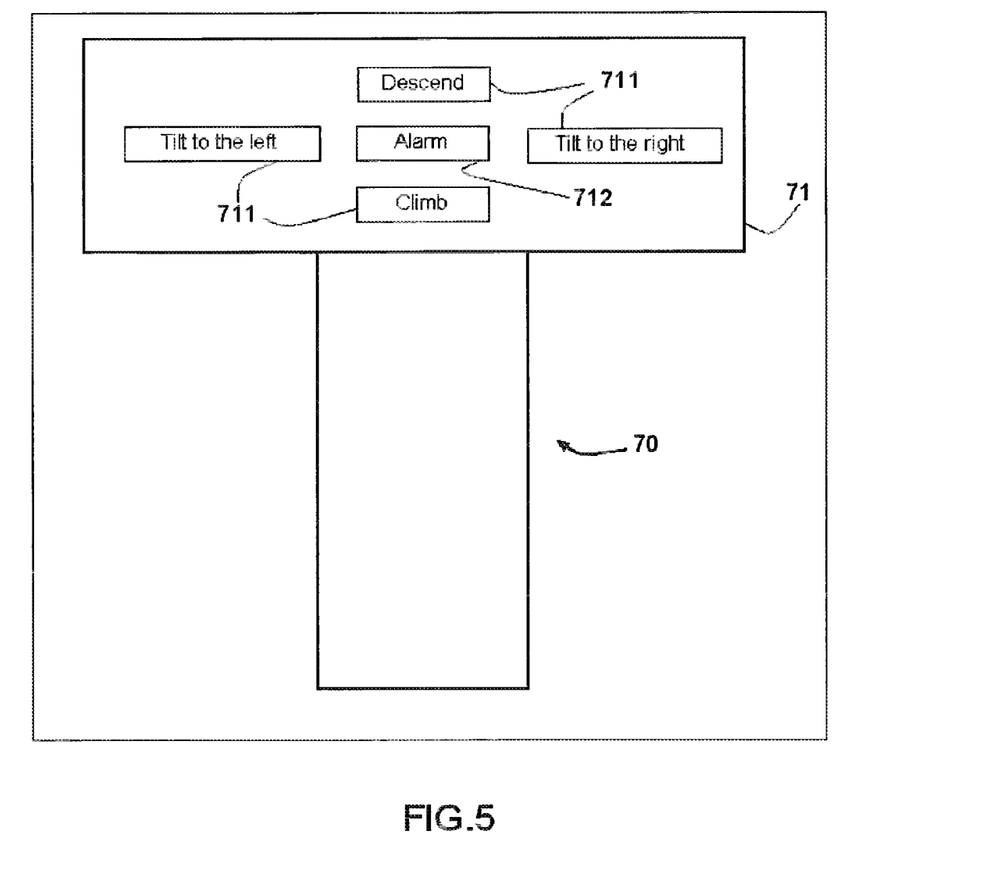

The control box 71 is mounted on the pilot's stick 70 (or the pilot's two sticks for an helicopter) as shown in FIG. 5. It allows the monitor to dispatch signals to the opposite seat, that is to say to the student. In this example, push-buttons 711 (or any other equivalent means) make it possible to dispatch piloting directives (tilt to the right, climb etc.) without needing to dialogue verbally. The alarm button 712 makes it possible to dispatch a "high alarm" to attract attention to an imminent danger, or to awaken the student's attention.

Figure 6:
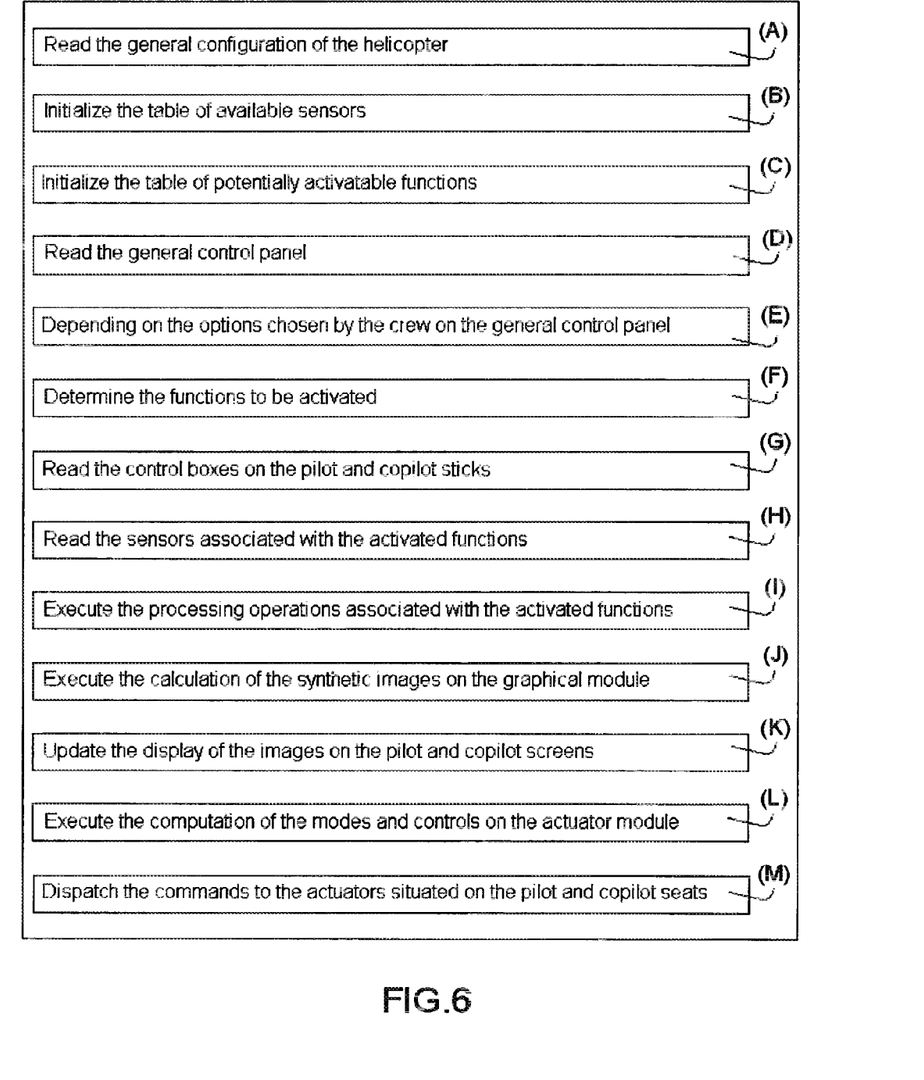
FIG. 6 is a list of the successive operating steps of a system according to the invention, FIG. 7 illustrate examples of display on the display screens of the pilot and optionally of the copilot.

The operating aspect of the system according to the invention is now tackled, described in conjunction with FIG. 6. The processing operations which include initialization processing operations, are performed in real time on the computer 50 and in the order indicated herein below.

A) Read the general configuration of the aircraft: the computation module 51 reads from a table of constants, the aircraft constructor's parameters used by the piloting, monitoring, coaching-training, and health functions.

This entails for example the maximum lengths of cable, the limit angles, the authorized maximum accelerations on all the axes, the limits on the attitudes, etc.

B) Initialize the table of available sensors: the computation module 51 reads from a table of constants, the list of sensors present on the aircraft as well as their relevant characteristics. This entails reading certain calibration characteristics such as:

The limit values of the data dispatched by the set of sensors 120, their resolution etc.

The dynamic characteristics of these data such as the time constants, the refresh frequency, the linearity corrections, etc.

C) Initialize the table of potentially activatable functions: the computation module 51 constructs a table of booleans which authorize the use of the piloting, monitoring, coaching-training, health functions by the crew. This table is constructed on the basis of the results provided in steps A) and B).

D) Read the general control panel 20: the computation module 51 reads the current state of all the buttons (or other equivalent means) described in FIG. 4 while complying with the communication protocol used on the buses.

E) Depending on the options chosen by the crew on the general control panel 20, the computation module 51 performs the following actions:

Compute the values of the parameters to be initialized for the graphical module 53 and the actuator module 52;

Check the state of the buses for communication with these modules;

Dispatch the initial values to the modules;

Read the reports of possible errors.

F) Determine the functions to be activated: the computation module 51 reads the results provided in step D) compares with the results provided in step C) and constructs a table of the functions and sub-functions activated.

G) Read the control boxes on the pilot and copilot sticks: the computation module 51 reads the current state of the buttons described in FIG. 5 only if the coaching-training function is activated in step F).

H) Read the sensors associated with the activated functions: the computation module 51 reads the values provided by the sensors while complying with the logic described hereinabove in the part of the description devoted to the sensors. The validity of these values is verified as a function of the results provided in step B).

I) Execute the processing operations associated with the activated functions: the computation module 51 performs the following actions:
    Read the results provided in steps F), G) and H);
    Call the processing operations A to D as required;
    Dispatch the activation logic and the values of the parameters computed for the graphical module 53 and the actuator module 52.
I1) Processing of the health function:
    Read the vertical, horizontal and lateral accelerations provided by the sensors;
    Choose the filtering laws as a function of the results provided in steps B) and E);
    Compute the damping parameters to be applied to the actuators of the damping device 85 (amplitude, frequencies, waveforms, phase delay/advance).
I2) Processing of the "piloting" function:
    Read the useful information provided by the sensors;
    Choose the types of actions requested of the pilot (change trim, change roll, climb, descend) as well as their degree of urgency (calmly, urgent etc.); these actions may be combined.
    Compute the logic for activating the actuators 81 on the seats and the safety harnesses as well as the value of the associated physical parameters;
    Compute the logic for activating the images as well as the associated graphical parameters.
I3) Processing of the "monitoring" function:
    Read the useful information provided in steps G and H);
    Choose as a function of the threats found, the geographical zone of the seat to be actuated (top of the back, bottom of the back, left lateral, under the buttocks etc.) as well as the urgency level (warning, caution); the zone and the urgency level may be combined;
    Compute the logic for activating the actuators 81 on the seats and the safety harnesses as well as the value of the associated physical parameters;
    Compute the logic for activating the images as well as the associated graphical parameters.
I4) Processing of the "coaching-training" function:
    Read the useful information provided in step G);
    Choose as a function of the manually requested actions, the geographical zone of the seat to be actuated in the same manner as for the piloting function (see the processing I2 hereinabove);
    Compute the logic for activating the actuators 81 on the seats and the safety harnesses as well as the value of the associated physical parameters;
    Compute the logic for activating the images as well as the associated graphical parameters.
J) Execute the computation of the synthetic images on the graphical module 53 which performs the following actions:
    Read on its bus the parameters dispatched in real time by the computation module 51;
    Plot locally in RAM, the images such as for example those described in FIG. 6;
    Dispatch to the computation module 51 a report describing the possible errors.
K) Update the display of the images on the pilot and copilot screens: the graphical module 53 performs the following actions:
    Dispatch the images constructed locally on the video bus(es) linked to the screens;
    Dispatch to the computation module 51 a report describing the possible errors.
L) Execute the computation of the modes and controls on the actuator module 52 which performs the following actions:
    Read on its bus the parameters dispatched in real time by the computation module 51;
    Compute locally for each pathway the displacement laws applicable as a function of the current state;
    Dispatch to the computation module 51 a report describing the possible errors.
M) Dispatch the commands to the actuators situated on the pilot and copilot seats: the actuator module 52 performs the following actions:
    Dispatch electrical commands on each ram;
    Dispatch to the computation module 51 a report describing the possible errors.

Examples of images displayed on the screen 30 of the pilot and optionally on that of the copilot 30' are described in the following passage. Indeed, visual information is advantageously provided on screen to secure and consolidate the haptic information of the seat.

The images represented in FIG. 7 are updated in real time by the graphical module 53. The upper zone of the screen is for example dedicated essentially to the monitoring function, the lower zone of the screen being dedicated rather to the piloting and training functions. Both zones serve globally for the training function.

The upper zone is considered. For the monitoring of the exterior environment, two types of views are placed at the disposal of the pilot and/or of the copilot:
    The longitudinal view (FIG. 7*a*),
    The lateral view (FIG. 7*b*).

The longitudinal view presents the information useful for monitoring the environment outside the helicopter in the vertical plane. The circle 31 represents (by means of 8 angular sectors of 45 degrees) the state of the threats close to the aircraft (other aircraft and/or obstacles detected above, below, in front, behind). These threats are detected by the intruder sensor(s) 126. Depending on the existence, the direction and the gravity of the threat, each sector may be non-colored, or colored amber or red.

The symbol 32 represents the current angle of the external load in the longitudinal direction. This angle is computed on the basis of the information provided by the cable angle sensor(s) 128, and by the cable tension sensor(s) 129. This angle must always lie between two limit values tied to the performance of the helicopter considered as well as to the meteorological conditions and to the authorized limit values of the tension of the cable. These two longitudinal limit values are represented in red by the symbol 33.

The lateral view (FIG. 7*b*) represents the information useful for monitoring the environment outside the aircraft in the lateral plane. The aircraft is viewed from behind.

The circle 34 represents (by means of 8 angular sectors of 45 degrees) the state of the threats close to the aircraft (other aircraft and/or obstacles detected above, below, to the left, to the right). These threats are detected by means of intruder sensor(s) 126. Depending on the existence, the direction and the gravity of the threat, each sector may be non-colored, or colored amber or red.

The symbol 35 represents the current angle of the external load in the lateral direction. This angle is computed on the basis of the information provided by the cable angle sensor(s) 128 and by the cable tension sensor(s) 129. This angle must always lie between two limit values represented by the angle 36, tied to the performance of the helicopter considered as well as to the meteorological conditions and to the authorized limit values of the tension of the cable.

The amber or red graphical representation of the symbols 31 to 36 is typically associated with alarms of the seat.

The lower zone is considered now. For the piloting and training functions, two types of views are placed at the disposal of the pilot and of the copilot:

The copilot view to the left (FIG. 7c):
The pilot view to the right (FIG. 7d).

These views represent in perspective and in a stylized manner, the seats 80 and the control sticks 70 in the case of an helicopter. These representations are fixed.

The arrows exhibited in the figure are always visible and positioned fixed. The internal content is empty. They are associated with the sticks. These arrows make it possible to indicate to the pilot or to the copilot the direction in which it is necessary to act on the controls so as to change the trajectory of the aircraft. The arrows 39 indicate a roll movement, 37 a trim movement and 38 a vertical movement.

When an action on the stick is necessary, the direction is indicated by an arrow which starts blinking and fills with green color. By way of (non-exhaustive) example, the following cases are exhibited:

The arrow 39 indicates to the pilot that it is necessary to shift the stick towards the right, therefore to tilt the aircraft towards the right about the roll axis;

The arrow 38 indicates to the pilot that it is necessary to shift the stick upwards, therefore to make the aircraft climb vertically along the yaw axis.

What is claimed is:

1. A system for assisting a pilot of an aircraft, the system being configured to be installed aboard the aircraft and comprising:
   an avionics computer system of the aircraft,
   a set of sensors configured to provide data to the computer and,
   a seat for the pilot, the seat being equipped with haptic actuators controlled by the computer,
   wherein the computer is configured to control each actuator or groups of actuators independently of one another, as a function of the data provided by the sensors,
   wherein the seat comprises a back and a cushion,
   wherein the actuators of the back and of the cushion comprise single-axis mini-rams distributed in the back and the cushion of the seat,
   wherein displacement axes of the single-axis mini-rams distributed in the back of the seat are perpendicular to the back of the seat, and
   wherein displacement axes of the single-axis mini-rams distributed in the cushion of the seat are perpendicular to the cushion of the seat.

2. The system according to claim 1, wherein the seat further comprises a safety harness equipped with distributed actuators.

3. The system according to claim 2, wherein the actuators of the harness are vibrators.

4. The system according to claim 1, wherein the seat further comprises lateral returns and wherein the lateral returns comprise actuators with single-axis mini-rams that are distributed in the lateral returns.

5. The system according to claim 1, wherein the mini-rams are configured to move according to a displacement, wherein a length of the displacement is within a predetermined range, wherein a speed of the displacement is below a predetermined maximum speed, wherein a frequency of the displacement is below a predetermined maximum frequency, wherein the computer that is configured to control the actuators or the groups of actuators is further configured to control at least one of the length of the displacement, the speed of the displacement, or the frequency of the displacement.

6. The system according to claim 1, further comprising:
   a device for damping the seat.

7. The system according to claim 1, further comprising:
   another seat for a copilot, the other seat being equipped with actuators that are similar to the actuators in the seat of the pilot.

8. The system according to claim 7, wherein the aircraft comprises one or more control sticks, wherein each of the one or more control sticks comprises a control box linked to the computer, and each control box is configured to dispatch control commands for the actuators of the other seat to the computer.

9. The system according to claim 1, wherein the sensors are piloting sensors and wherein the piloting sensors include at least one of:
   sensors of attitude,
   sensors of position,
   sensors of altitude,
   sensors of height, or
   sensors of acceleration.

10. The system according to claim 1, wherein the sensors are sensors for detecting threats.

11. The system according to claim 1, wherein the aircraft is configured to pull an external load using a cable, wherein the sensors comprise sensors of data regarding:
   at least one angle of the cable relative to a vertical axis,
   a length of the cable, and
   a tension of the cable.

12. The system according to claim 1, further comprising:
   a general control panel, the general control panel being configured to enable selection of at least one of a piloting mission, a monitoring mission, or a training mission, wherein the actuators are controlled by the computer as a function of the one or more missions that were selected and wherein the general control panel is linked to the computer.

13. The system according to claim 1, further comprising:
   at least one screen for displaying at least one of:
      graphical information regarding monitoring of an environment of the aircraft,
      graphical information regarding piloting, or
      graphical information regarding training,
   wherein the at least one screen is linked to the computer.

14. The system according to claim 1, wherein the aircraft is an airplane or a helicopter.

* * * * *